US011047484B2

(12) United States Patent
Smick et al.

(10) Patent No.: US 11,047,484 B2
(45) Date of Patent: Jun. 29, 2021

(54) FIXED CONE VALVE WITH DUAL SEATING SYSTEM

(71) Applicant: Mueller International, LLC, Atlanta, GA (US)

(72) Inventors: Stephen J. Smick, Oswego, IL (US); Sergio Alejandro Diaz, Oswego, IL (US)

(73) Assignee: Mueller International, LLC, Atlanta, GA (US)

( * ) Notice: Subject to any disclaimer, the term of this patent is extended or adjusted under 35 U.S.C. 154(b) by 45 days.

(21) Appl. No.: 16/545,287

(22) Filed: Aug. 20, 2019

(65) Prior Publication Data
US 2021/0054940 A1 Feb. 25, 2021

(51) Int. Cl.
*F16K 1/44* (2006.01)
*F16K 1/12* (2006.01)

(52) U.S. Cl.
CPC .............. *F16K 1/443* (2013.01); *F16K 1/123* (2013.01); *Y10T 137/3367* (2015.04)

(58) Field of Classification Search
CPC ..... F16K 1/443; F16K 1/123; Y10T 137/3367
See application file for complete search history.

(56) References Cited

U.S. PATENT DOCUMENTS

| 2,962,039 | A | * | 11/1960 | Shand | F16K 31/52433 |
| | | | | | 137/219 |
| 4,137,933 | A | * | 2/1979 | Culpepper | F16K 1/123 |
| | | | | | 137/219 |
| 4,172,469 | A | * | 10/1979 | Boehringer | F16K 1/126 |
| | | | | | 137/512.3 |
| 4,738,282 | A | * | 4/1988 | Boehringer | F16K 15/18 |
| | | | | | 137/503 |
| 5,826,613 | A | * | 10/1998 | Schalk | F16K 1/123 |
| | | | | | 137/219 |
| 8,960,229 | B2 | | 2/2015 | Smick | |
| 2010/0102259 | A1 | * | 4/2010 | Forster | F16K 31/0651 |
| | | | | | 251/129.01 |

OTHER PUBLICATIONS

VAG; Operation and Maintenance Instructions for Hollow Jet Discharge Valve, publicly available prior to Aug. 20, 2019, 1 pg.

* cited by examiner

*Primary Examiner* — Kevin R Barss
(74) *Attorney, Agent, or Firm* — Taylor English Duma LLP (57) ABSTRACT

Example aspects of a dual seating system, a fixed cone valve, and a method for using a dual seating system are disclosed. The dual seating system can comprise a gate comprising a gate metal seat; and a cone seat assembly comprising a cone metal seat and a cone rubber seat; wherein the gate metal seat is configured to seat with the cone metal seat to define a metal-to-metal seating and the gate metal seat is configured to seat with the cone rubber seat to define a metal-to-rubber seating.

20 Claims, 7 Drawing Sheets

FIG. 7 ated with a cone seat assembly and gate of a fixed cone valve.

FIXED CONE VALVE WITH DUAL SEATING SYSTEM

TECHNICAL FIELD

This disclosure relates to valves. More specifically, this disclosure relates to a fixed cone valve comprising a dual seating system.

BACKGROUND

Valves, such as fixed cone valves, can be used to control the flow of liquid (e.g., water, oil, gas) in a fluid system. Fixed cone valves comprise a movable cylinder configured to engage and disengage a fixed seat. Typically, the seat and the cylinder are formed from a metal material. While metal can be durable, the metal-to-metal seating between the cylinder and the seat can be prone to leakage. Various factors, such as manufacturing tolerances, temperature changes, the shifting of components, improper installation, vibrations during use, and normal wear and tear can all contribute to leakage issues.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is dual seating system comprising a gate comprising a gate metal seat; and a cone seat assembly comprising a cone metal seat and a cone rubber seat; wherein the gate metal seat is configured to seat with the cone metal seat to define a metal-to-metal seating and the gate metal seat is configured to seat with the cone rubber seat to define a metal-to-rubber seating.

Also disclosed is a fixed cone valve comprising a valve body; and a dual seating system comprising: a fixed cone assembly; and a gate configured to move relative to the valve body and the fixed cone assembly between a retracted position and an extended position; wherein, in the extended position, the dual seating system is configured to define a first seating between the gate and the fixed cone assembly and a second seating between the gate and the fixed cone assembly.

Also disclosed is a method for using a dual seating system, the method comprising providing a gate and a cone seat assembly; moving the gate relative to the cone seat assembly from a retracted position to an extended position; engaging a gate metal seat of the gate with a cone metal seat of the cone seat assembly to form a metal-to-metal seating; and engaging the gate metal seat with a cone rubber seat of the cone seat assembly to form a metal-to rubber seating.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a fixed cone valve and associated methods, systems, devices, and various apparatus. Example aspects of the fixed cone valve can comprise a dual seating system configured to reduce the likelihood of leakage through the seat system. In some aspects, the dual seating system can comprise a first seating, such as a metal-to-metal seating, and a second seating, such as a metal-to-rubber seating. It would be understood by one of skill in the art that the disclosed fixed cone valve is described in but a few exemplary aspects among many. No particular terminology or description should be considered limiting on the disclosure or the scope of any claims issuing therefrom.

Figure 1:
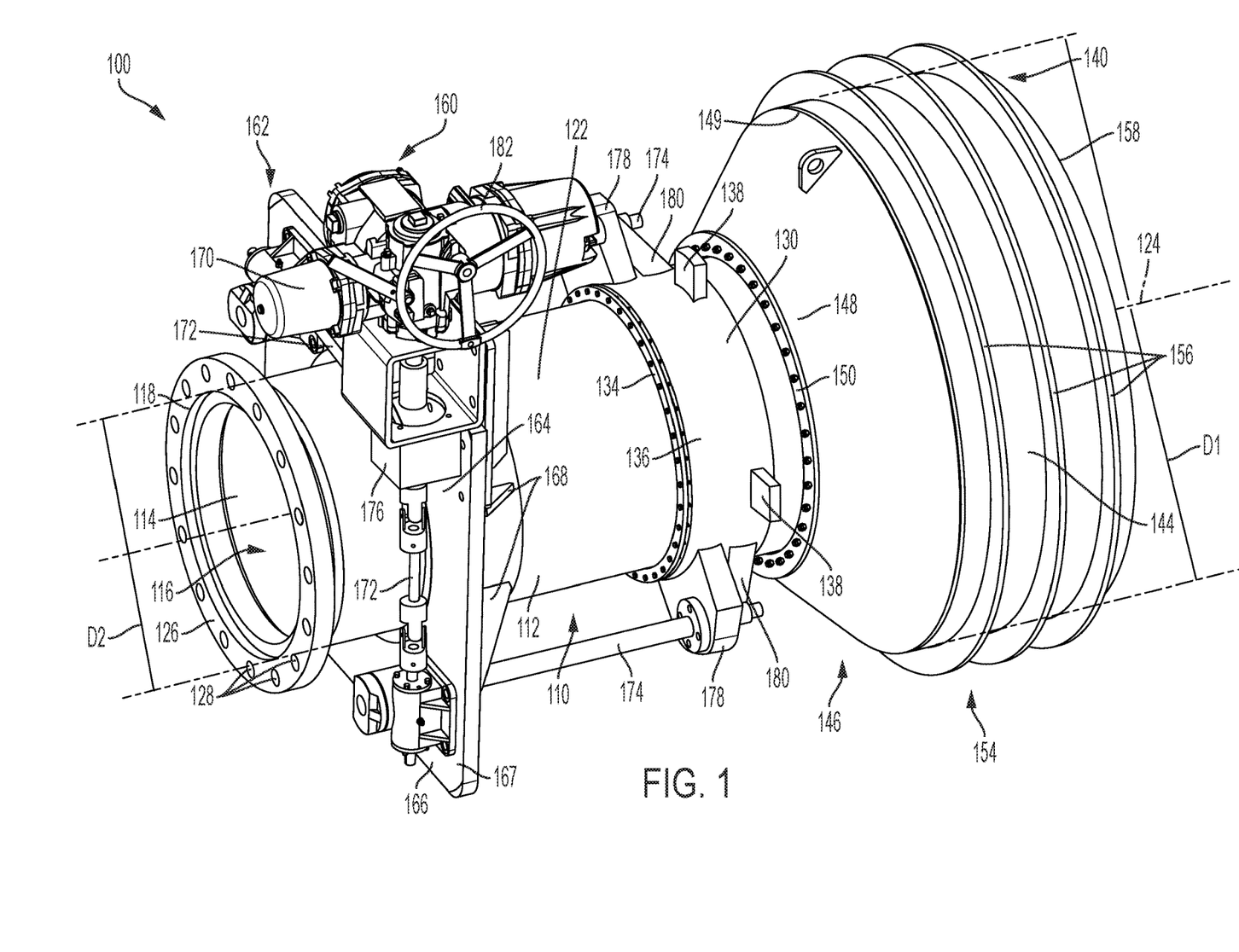
FIG. 1 is a perspective view of a fixed cone valve, according to an example aspect of the present disclosure.

FIG. 1 illustrates a first aspect of a fixed cone valve 100 according to the present disclosure. Example aspects of the fixed cone valve 100 can be assembled with a fluid system (not shown), such as, for example, a dam or reservoir. Example aspects of the fixed cone valve 100 can be configured to regulate the flow of fluid from the dam, reservoir, or other fluid system. As shown, the fixed cone valve 100 can comprise a substantially cylindrical valve body 110 defining a body inner surface 114 and a body outer surface 112. The body inner surface 114 can define a fluid cavity 116 through which fluid from the fluid system can flow along a flow path. Example aspects of the valve body 110 can be substantially cylindrical in shape, as shown, and can define a valve inlet end 118, a valve outlet end 320 (shown in FIG. 3) opposite the valve inlet end 118, and an intermediate section 122 therebetween. A valve body axis 124 can extend through the fluid cavity 116 from the valve outlet end 320 to the valve inlet end 118 and can be concentric to the body inner surface 114 of the valve body 110. According to example aspects, a normal flow path for fluid flowing through the fixed cone valve 100 can be defined by fluid flowing into the fluid cavity 116 through the valve inlet end 118 and out of the fluid cavity 116 through the valve outlet end 320. In some other aspects, the flow path can be reversed, such that the fluid can flow into the fluid cavity 116 through the valve outlet end 320 and out of the fluid cavity 116 through the valve inlet end 118. Example aspects of the valve body 110 can be formed from a metal material, such as, for example, steel, and more specifically, carbon steel. In other aspects, the valve body 110 can be formed from any other suitable material known in the art, including but not limited to, other metals such as iron or stainless steel, plastic, or the like.

According to example aspects, a mounting flange 126 can be defined at the valve inlet end 118 of the valve body 110, as shown. The mounting flange 126 can be configured to be mounted to a mating mounting flange (not shown) of the fluid system, such as a flanged end of a pipe or a mechanical joint for plain-end pipe. Example aspects of the mounting flange 126 can define one or more mounting bores 128 extending therethrough. The mating mounting flange of the fluid system can also include mating mounting bores (not shown) configured to align with the mounting bores 128 of the mounting flange 126. In example aspects, one or more fasteners (not shown) can couple the mounting flange 126 to the mating mounting flange. The fastener can be, for example, a nut and bolt assembly, or can be any other suitable fastener known in the art. The one or more fasteners can extend through the mounting bores 128 of the mounting flange 126 and the mating mounting bores of the mating mounting flange to couple the fixed cone valve 100 to the fluid system at the valve inlet end 118 of the valve body 110. Example aspects of the mounting flange 126 can be monolithically formed with the valve body 110, and as such, can comprise the same material as the valve body 110. However, in other aspects, the mounting flange 126 can be separately formed from the valve body 110 and may comprise another suitable material known in the art.

Example aspects of the fixed cone valve 100 can further comprise a substantially cylindrical gate 130 configured to encircle the substantially cylindrical valve body 110 proximate the valve outlet end 320. The gate 130 can be generally concentric to the valve body axis 124. As shown, the gate 130 can define a gate first end 232 (shown in FIG. 2) and a gate second end 134. The gate 130 can further define a gate outer surface 136 and a gate inner surface 636 (shown in FIG. 6). The gate inner surface 636 can define a gate cavity 639 (shown in FIG. 6). As shown, the gate 130 can comprise one or more gate arms 138 extending radially outward, relative to the valve body axis 124, from the gate outer surface 136 of the gate 130. The gate arms 138 can be used during manufacturing to hold the gate 130 securely in place. According to example aspects, the gate 130 can be configured to slide axially relative to the valve body 110 between a retracted position (shown in FIG. 3), wherein the valve is open, and an extended position (shown in FIG. 5), wherein the valve is closed. In the retracted position, the gate first end 232 of the gate 130 can be substantially aligned with the valve outlet end 320 of the valve body 110, and in the extended position, the gate first end 232 of the gate 130 can extend beyond the valve outlet end 320 of the valve body 110, as described in further detail below. Example aspects of the gate 130 can be formed from a metal material, such as, for example, steel, and more specifically, stainless steel. In other aspects, the gate 130 can be formed from any other suitable material known in the art, including but not limited to, other metals such as iron or carbon steel, plastic, or the like.

As shown, in some aspects, the fixed cone valve 100 can comprise a hood 140 positioned proximate to the valve outlet end 320 (shown in FIG. 3) of the valve body 110. In some aspects, the hood 140 can be mounted to a fixed cone assembly 200 (shown in FIG. 2) of the fixed cone valve 100. Example aspects of the hood 140 can be configured to control the flow of fluid out of the valve outlet end 320 of the valve body 110. Example aspects of the hood 140 can define a hood inner surface 242 (shown in FIG. 2) and a hood outer surface 144. The hood 140 can define a substantially truncated cone portion 146 having a hood first end 148 oriented proximate the valve outlet end 320 of the valve body 110 and tapering outward therefrom to a hood second end 149. The hood first end 148 of the cone portion 146 can be connected to a sealing flange 150 configured to encircle the gate 130, as shown. For example, the hood first end 148 can be connected to the sealing flange 150 by one or more fasteners, such as for example, bolts, screws, welding, or any other suitable fastener known in the art. In example aspects, the sealing flange 150 can create a watertight seal between the gate 130 and the hood 140 to prevent leakage of fluid between the hood 140 and the gate 130. For example, in one aspect, the sealing flange 150 can comprise a sealing ring 352 (shown in FIG. 3), for example, a rubber sealing ring, which can create a seal between the sealing flange 150 and the gate 130 while still allowing the gate 130 to slide axially relative to the hood 140. In other aspects, the hood 140 can be coupled to the gate 130 and can be configured to slide axially therewith.

As shown, a substantially cylindrical portion 154 of the hood 140 can extend from the hood second end 149 of the truncated cone portion 146. As such, the cylindrical portion 154 of the hood 140 can define a diameter $D_1$ that can be larger than a diameter $D_2$ of the valve body 110. In the present aspect, the cylindrical portion 154 of the hood 140 can define a plurality of annular ribs 156 extending from the hood outer surface 144 thereof. The annular ribs 156 can serve to reduce deflection, vibration, and stresses in the hood 140. According to example aspects, the cylindrical portion 154 of the hood 140 can define a hood outlet end 158 distal from the truncated cone portion 146 of the hood 140. The hood inner surface 242 of the hood 140 can define a hood cavity 240 (shown in FIG. 2) through which fluid from the fluid system can flow. For example in some aspects, fluid can flow through the valve outlet end 320 of the valve body 110 and into the hood cavity 240 at the hood first end 148 of the cone portion 146 of the hood 140. The fluid can then flow through the hood cavity 240 from the truncated cone portion 146 to the cylindrical portion 154 and can flow out of the hood outlet end 158. In other aspects, the flow of fluid can be reversed. Example aspects of the hood 140 can be formed from a metal material, such as, for example, steel, and more specifically, carbon steel. In other aspects, the hood 140 can be formed from any other suitable material known in the art, including but not limited to, other metals such as iron or stainless steel, plastic, or the like. In other aspects, the fixed cone valve 100 may not comprise the hood 140. The hood 140 is shown and described in further detail with respect to FIG. 2.

According to example aspects, the fixed cone valve 100 can further comprise a drive assembly 160 for moving the gate 130 between the retracted position and the extended position. The drive assembly 160 can be mounted to a mounting assembly 162, as shown. In some aspects, the mounting assembly 162 can comprise a drive assembly mounting bracket 164 and one or more drive assembly reinforcing ribs 168. The drive assembly reinforcing ribs 168 can be configured to provide support the drive assembly mounting bracket 164 and to couple the drive assembly mounting bracket 164 to the body outer surface 112 of the valve body 110. A bottom portion 166 of the drive assembly mounting bracket 164 can serve as a support leg 167 for supporting the fixed cone valve 100 on a support surface (not shown).

Example aspects of the drive assembly 160 can be similar to the drive assembly 160 disclosed in U.S. Pat. No. 8,960,229, issued Feb. 24, 2015, which is hereby incorporated by reference herein in its entirety. As shown, in the present aspect, the drive assembly 160 can comprise a motor 170, a pair of connector rods 172, and a pair of threaded drive shafts 174. The rotational movement of the motor 170 can be translated along a driveline to produce the axial movement of the gate 130. For example, in one aspect, rotational movement from the motor 170 can be translated by a splitter 176 to the pair of connector rods 172, and the connector rods 172 can translate rotational movement to a corresponding one of the drive shafts 174. Example aspects of the threaded drive shafts 174 can each define threading and can be threadably connected to a corresponding cam assembly 178 coupled to gate outer surface 136 of the gate 130. For example, each cam assembly 178 can define a threaded hole (not shown), which can threadably receive a corresponding one of the threaded drive shafts 174 therethrough. As each drive shaft 174 rotates, the drive shaft 174 be threaded further into or out of the corresponding threaded hole, effectually producing the axial sliding movement of the gate 130. In example aspects, when the drive shaft 174 is threaded further out of the corresponding threaded hole, the drive shaft 174 can be only partially unthreaded from the threaded hole, such that the drive shaft 174 remains engaged with the threaded hole. Furthermore, according to example aspects, each of the cam assemblies 178 can be reinforced by a corresponding cam assembly reinforcement rib 180 extending between the cam assembly 178 and the body outer surface 112 of the valve body 110, as shown. Some aspects of the drive assembly 160 can include a hand wheel 182 in addition to, or in replacement of, the motor 170. The hand wheel 182 can be manually rotated, the rotation of which can be translated along the driveline as described above to result in the axial movement of the gate 130.

Figure 2:
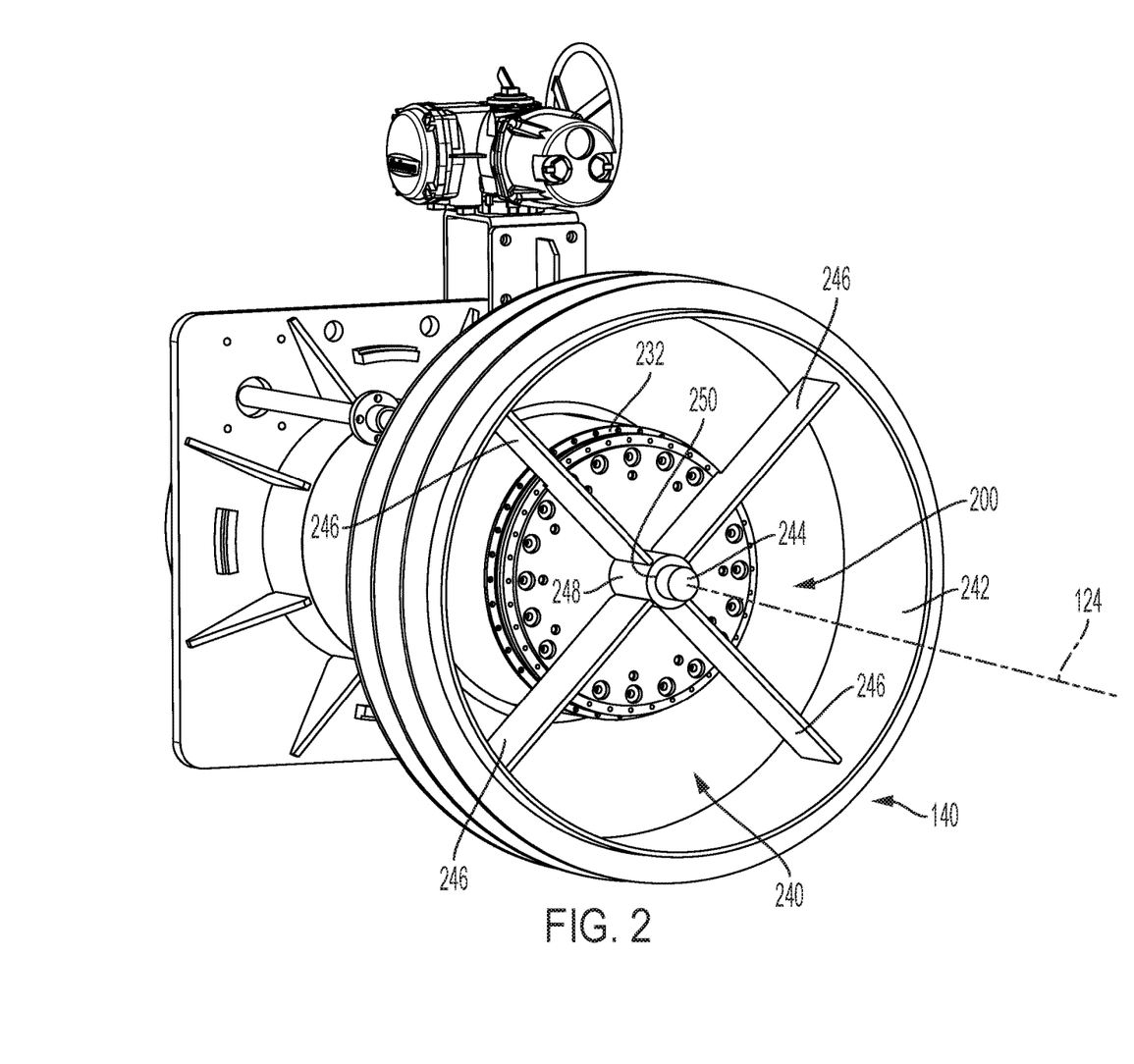
FIG. 2 is a perspective view of a hood of the fixed cone valve of FIG. 1.

FIG. 2 illustrates the hood 140 of the fixed cone valve 100 (shown in FIG. 1) in further detail. As shown, the fixed cone valve 100 can further comprise the fixed cone assembly 200, which is described in greater detail below. Example aspects of the fixed cone assembly 200 assembly can comprise a hood mounting post 244 extending from the fixed cone assembly 200, which can be substantially concentric with the valve body axis 124. In some aspects, the hood mounting post 244 can be reinforced relative to the fixed cone assembly 200 by one or more mounting post reinforcement ribs 446 (shown in FIG. 4). The hood 140 can comprise a plurality of hood vanes 246 extending radially inward, relative to the valve body axis 124, from the hood inner surface 242 of the hood 140 and into the hood cavity 240. According to example aspects, the hood vanes 246 can be configured to reduce the turbulence of fluid flowing through the hood cavity 240. The hood vanes 246 can terminate at a hood mounting tube 248 defining a mounting bore 250 therethrough. The mounting bore 250 can be substantially concentric with the valve body axis 124, as shown. The hood mounting post 244 can be received through the mounting bore 250 of the hood mounting tube 248 to couple the hood 140 to the fixed cone assembly 200. In some aspects, a nut (not shown) can be provided and can be threaded onto the hood mounting post 244 to prevent the hood mounting post 244 from disengaging the mounting bore 250. As such, the hood 140 can be effectively bolted onto the fixed cone assembly 200. In other aspects, the hood 140 can be mounted to the fixed cone valve 100 at any other suitable located by any other suitable mounting means. Furthermore, as noted above, some aspects of the fixed cone valve 100 may not comprise the hood 140.

Figure 3:
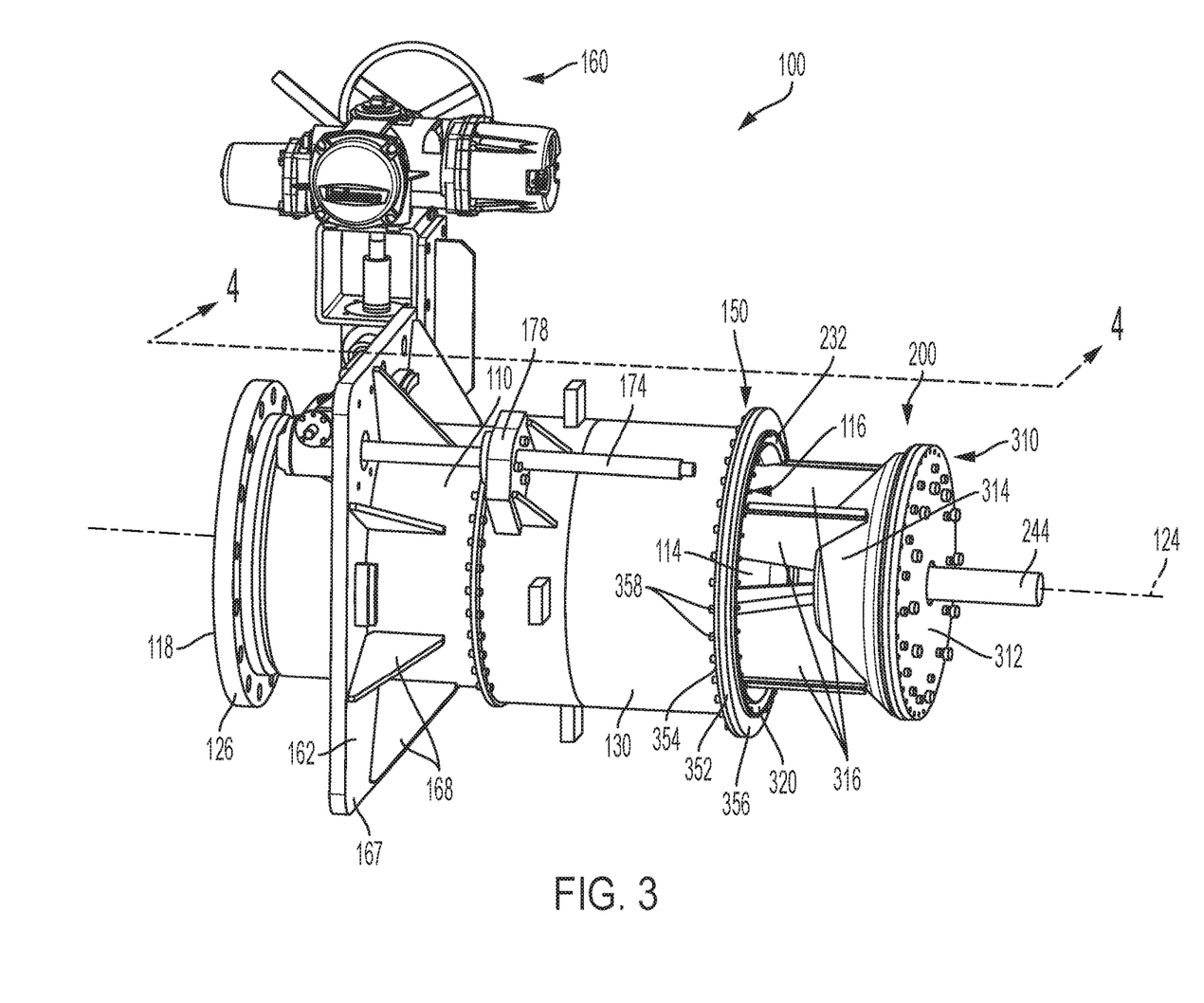
FIG. 3 is a perspective view of the fixed cone valve of FIG. 1, wherein a gate of the fixed cone valve is a retracted position and the fixed cone valve is open.

FIG. 3 illustrates the fixed cone valve 100 with the hood 140 (shown in FIG. 1) removed and with the gate 130 in the retracted position. According to example aspects, the sealing flange 150 can comprise the sealing ring 352 received between a first seal retainer 354 and a second seal retainer 354. The hood 140 can be attached to the sealing flange 150 at the second seal retainer 356. In example aspects, one or more fasteners 358 can be provided for coupling the first seal retainer 354 and second seal retainer 356 to the sealing ring 352. For example, the fasteners 358 can be a threaded stub and nut assembly or any other suitable fastener known in the art. As shown, the fixed cone valve 100 can further comprise the fixed cone assembly 200 fixedly coupled to the valve body 110. The fixed cone assembly 200 can comprise a cone seat assembly 310 and a plurality of seat vanes 316 extending therefrom. According to example aspects, the cone seat assembly 310 can be spaced away from the valve body 110 proximate to the valve outlet end 320 thereof and can be substantially aligned with the valve body axis 124, as shown. Example aspects of the cone seat assembly 310 can define a substantially flat retainer plate 312 and a cone body 314 extending from the retainer plate 312. The cone body 314 can define a substantially truncated cone shape and can taper radially inward from the retainer plate 312 in the direction of the valve outlet end 320.

As shown, the plurality of seat vanes 316 can extend from the cone body 314 of the cone seat assembly 310 into the fluid cavity 116 of the valve body 110 through the valve outlet end 320 thereof, and can be attached to the body inner surface 114 of the valve body 110 to affix the fixed cone assembly 200 relative to the valve body 110. In some aspects, the seat vanes 316 can be monolithically formed with the cone seat assembly 310, while in other aspects the seat vanes 316 and cone seat assembly 310 can be separately formed. In instances where the hood 140 (shown in FIG. 1) is present, the portion of the seat vanes 316 external to the fluid cavity 116 of the valve body 110 can generally be received within the hood cavity 240 (shown in FIG. 2). In some aspects, some or all of the cone seat assembly 310 can also be received within the hood cavity 240. According to example aspects, the seat vanes 316 can serve to reduce the turbulence of the fluid flowing through the fluid cavity 116, and can also reduce the turbulence of fluid flowing through the hood cavity 240 in aspects comprising the hood 140.

Figure 4:
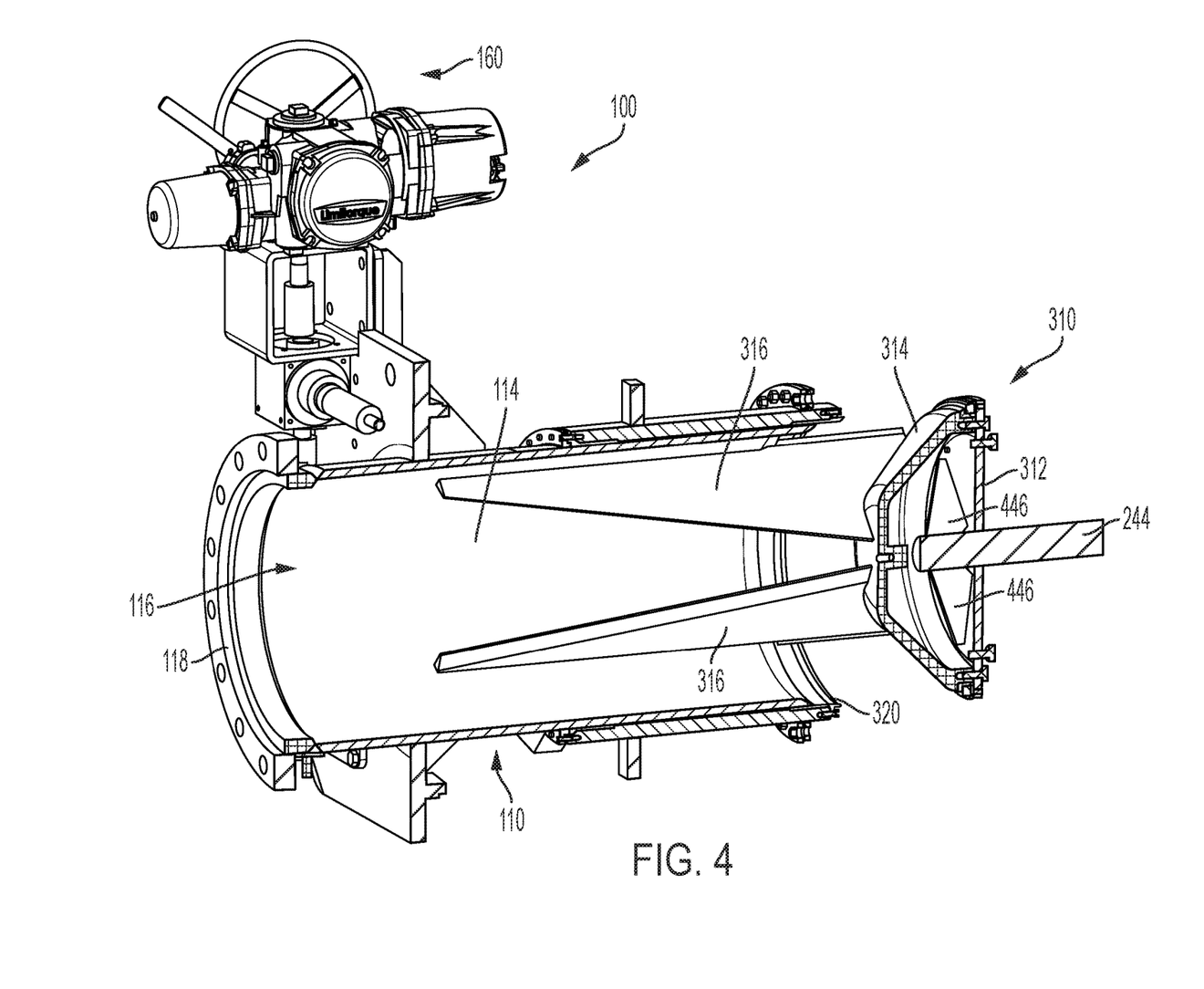
FIG. 4 is a cross-sectional view of the fixed cone valve of FIG. 1 taken along line 4-4 in FIG. 3.

FIG. 4 illustrates a cross-sectional view of the fixed cone valve 100 taken along line 4-4 in FIG. 3, showing the seat vanes 316 extending into the fluid cavity 116 of the valve body 110 in further detail. As shown, the seat vanes 316 can be coupled to the body inner surface 114 of the valve body 110.

Referring still to FIG. 3, the gate 130 can be oriented in the retracted position, and as such, the fixed cone valve 100 can be open. When the fixed cone valve 100 is open, fluid can be permitted to flow into the valve inlet end 118 of the valve body 110, through the fluid cavity 116, and out of the valve outlet end 320 of the valve body 110, or vice versa in situations where the flow is reversed. To orient the gate 130 in the retracted position, the drive assembly 160 can be operated as described above to thread each of the drive shafts 174 further through the threaded holes (not shown) in the corresponding cam assemblies 178, drawing the gate 130 towards the valve body 110 and away from the cone seat assembly 310. Fluid exiting the fluid cavity 116 through the valve outlet end 320 of the valve body 110 can flow around the seat vanes 316 and past the cone seat assembly 310. According to example aspects, fluid hitting the cone seat assembly 310 can be sprayed radially outward relative to the valve body axis 124 in a generally conical formation. In aspects comprising the hood 140 (shown in FIG. 1), the hood 140 may restrict the outward spray of the fluid around the cone seat assembly 310 to within the volume of the hood cavity 240 (shown in FIG. 1).

Figure 5:
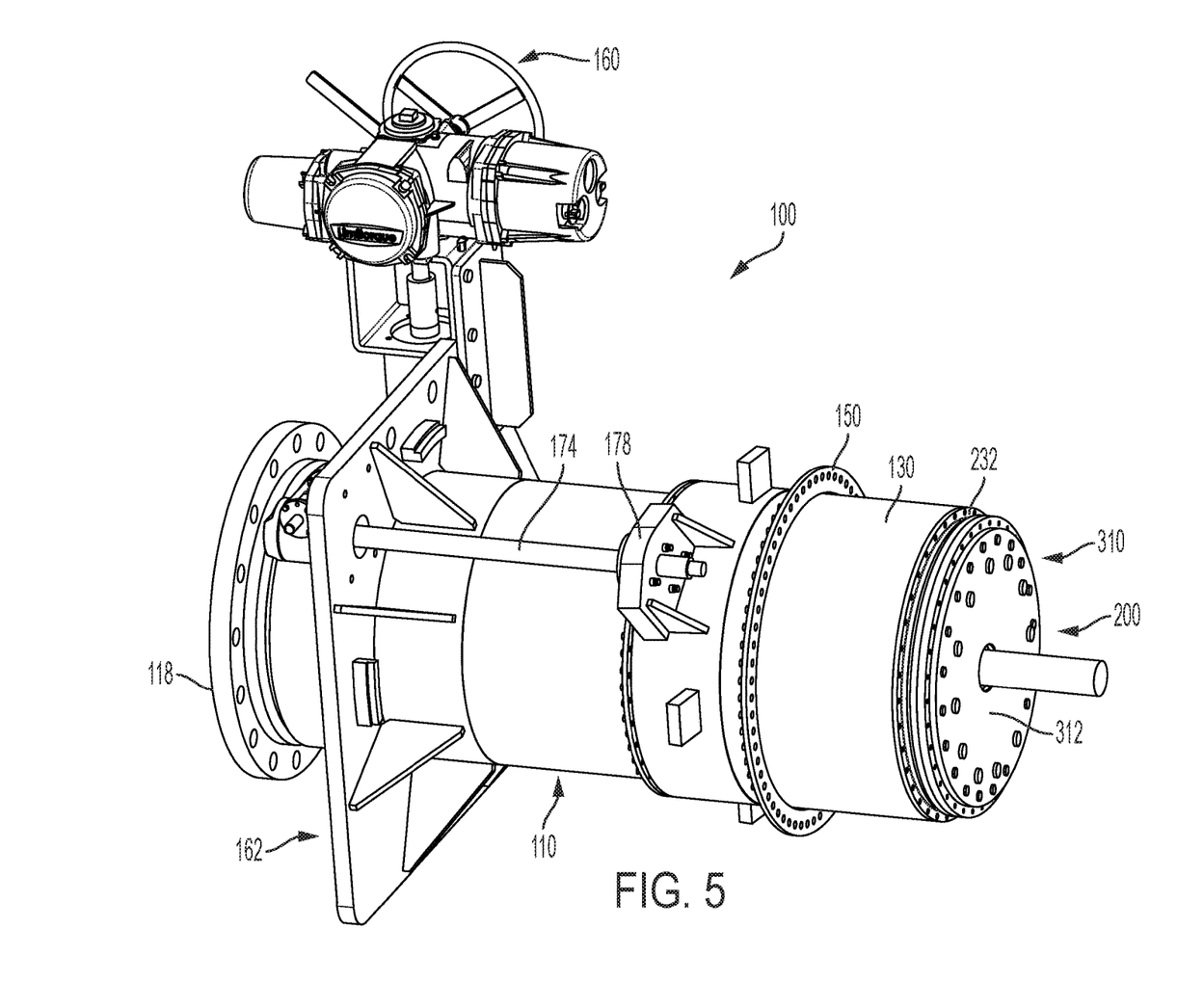
FIG. 5 is a perspective view of the fixed cone valve of FIG. 1, wherein the gate of FIG. 3 is in an extended position and the fixed cone valve is closed.

Referring to FIG. 5, the gate 130 can be oriented in the extended position, and as such, the fixed cone valve 100 can be closed. When the fixed cone valve 100 is closed, fluid can be prevented from flowing in any direction through the gate first end 232 of the gate 130, and thus, can be generally prevented from flowing through the fluid cavity 116 (shown in FIG. 1) of the valve body 110. To orient the gate 130 in the extended position, the drive assembly 160 can be operated as described above to unthread each of the drive shafts 174 partially out of the threaded holes in the corresponding cam assemblies 178, pushing the gate 130 past the valve outlet end 320 (shown in FIG. 3) of the valve body 110 and towards the cone seat assembly 310. As noted above, the drive shafts 174 can remain engaged with the threaded holes when unthreaded therefrom in the extended position. As shown, in the extended position, the gate first end 232 of the gate 130 can engage the cone seat assembly 310 and create a watertight seal therebetween to prevent fluid from flowing through the fluid cavity 116 of the fixed cone valve 100, as is described in further detail below with reference to FIGS. 6 and 7.

Figure 6:
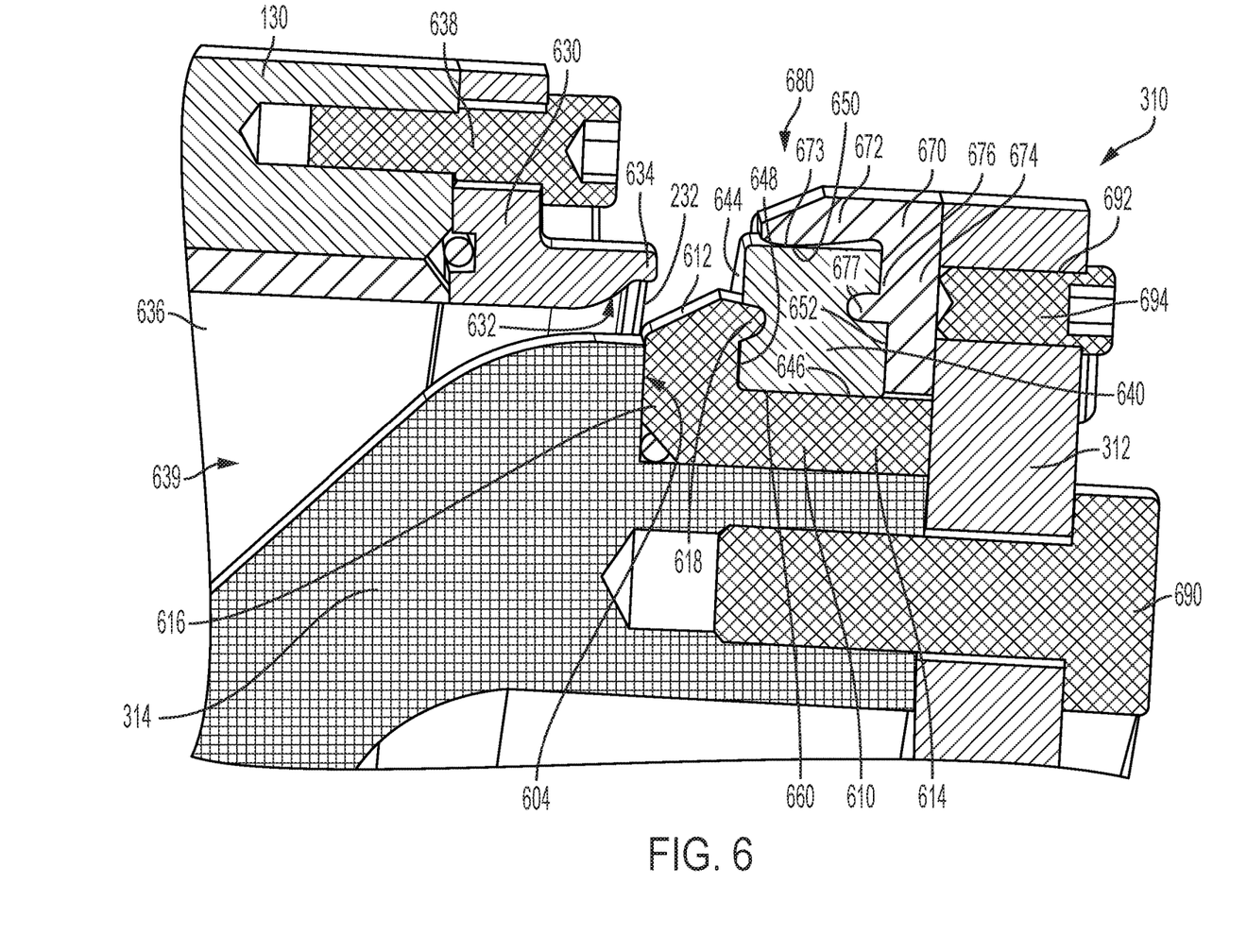
FIG. 6 is a close-up, cross-sectional view of the fixed cone valve of FIG. 1 taken along line 4-4 in FIG. 3, wherein the gate of FIG. 3 is partially extended.

FIG. 6 is a detail view of the cone seat assembly 310 and the gate 130 taken along line 4-4 in FIG. 3. The gate 130 is shown in a partially extended position, wherein the gate 130 can be slid axially towards the cone seat assembly 310 but does not engage the cone seat assembly 310. In such a position, the flow rate of the fluid through the fixed cone valve 100 (shown in FIG. 1) can be reduced as opposed to the flow rate of fluid when the gate 130 is in the fully retracted position (shown in FIG. 3). In this way, the axial position of the gate 130 can be selectively adjusted to control the flow rate of fluid through fluid cavity 116 (shown in FIG. 1) and the gate cavity 639 of the fixed cone valve 100.

Example aspects of the fixed cone valve 100 can define a dual seating system. For example, the dual seating system can comprise a first seating and a second seating. In a particular aspect, as shown, the gate 130 can comprise a substantially annular gate metal seat 630 and the cone seat assembly 310 can comprise a substantially annular cone metal seat 610. According to example aspects, the gate metal seat 630 can be attached to the gate 130 by one or more fasteners, such as, for example, a set screw 638, as shown. Other aspects of the gate metal seat 630 can be attached to the gate 130 by any other suitable fastener known in the art, or in still other aspects, the gate metal seat 630 can be monolithically formed with the gate 130. Each of the gate metal seat 630 and cone metal seat 610 can be formed from a metal material. When the gate 130 is in the extended position, an annular sloped gate seating surface 632 of the gate metal seat 630 can engage an annular sloped cone seating surface 612 of the cone metal seat 610 to define the first seating, which can be a metal-to-metal seating 710 (shown in FIG. 7) in the present aspect. Example aspects of the cone seat assembly 310 can further comprise a substantially annular cone rubber seat 640 formed from a rubber material, or another suitable flexible and resilient material known in the art. When the gate 130 is in the extended position, an annular gate projection 634 of the gate metal seat 630 can engage an annular cone rubber seating surface 644 of the cone rubber seat 640 to define the second seating, which can be a metal-to-rubber seating 720 (shown in FIG. 7) in the present aspect. According to example aspects, the annular gate projection 634 can be pressed into the cone rubber seat 640 until the annular sloped gate seating surface 632 abuts the annular sloped cone seating surface 612, and as such, the metal-to metal seating 710 can serve as a stop for controlling or limiting the compression of the annular gate projection 634 on the cone rubber seat 640. As such, the fixed cone valve 100 of the present disclosure can define the dual seating system comprising the metal-to-metal seating 710 between the gate metal seat 630 and the cone metal seat 610 and the metal-to-rubber seating 720 between the gate metal seat 630 and the cone rubber seat 640. Each of the metal-to-metal seating 710 and the metal-to-rubber seating 720 can serve to prevent fluid flow through the valve body 110 (shown in FIG. 1). In the event that the metal-to-metal seating 710 leaks, the dual seating system can provide the secondary metal-to-rubber seating 720 to prevent further leakage through the dual seating system.

As illustrated, the cone rubber seat 640 can be generally retained within a seating pocket 660 defined by the cone metal seat 610 and a retainer ring 670. The cone metal seat 610 can define a substantially L-shaped cross-section. A bottom leg 614 of the cone metal seat 610 can extend generally along a bottom end 646 of the cone rubber seat 640, and a side leg 616 of the cone metal seat 610 can extend partially along a first side 648 of the cone rubber seat 640. As shown, in example aspects, the first side 648 of the cone rubber seat 640 can define the cone rubber seating surface 644 that can seat with the gate projection 634 of the gate 130. Furthermore, as shown, the side leg 616 of the cone metal seat 610 can define a locking nub 618 extending therefrom and engaging the first side 648 of the cone rubber seat 640 proximate to the cone rubber seating surface 644. (For example, in the present aspect, the locking nub 618 can engage the cone rubber seat 640 at a location radially inward from the cone rubber seating surface 644.) According to various example aspects, the locking nub 618 can be angled radially outward relative to the valve body axis 124 (shown in FIG. 1). The side leg 616 of the cone metal seat 610 can be pressed against the cone rubber seat 640 as the gate 130 is seated with the seating assembly, and as such, the locking nub 618 can be pressed further into engagement with the cone rubber seat 640, further securing the cone rubber seat 640 within the seating pocket 660.

According to example aspects, the retainer ring 670 can also define a substantially L-shaped cross-section. A top leg 672 of the retainer ring 670 can extend generally along a top end 650 of the cone rubber seat 640, and a side leg 674 of the retainer ring 670 can extend generally along a second side 652 of the cone rubber seat 640. According to example aspects, the side leg 674 of the retainer ring 670 can define a compression shoulder 676 configured to press into the second side 652 of the cone rubber seat 640. As shown, the compression shoulder 676 can define a second locking nub 677 extending therefrom and engaging the second side 652 of the cone rubber seat 640. In example aspects, the second locking nub 677 can be substantially similar to the locking nub 618. The compression shoulder 676 and second locking nub 677 can be configured to compress the cone rubber seat 640 between the retainer ring 670 and the cone metal seat 610 to further secure the cone rubber seat 640 within the seating pocket 660. Other aspects may not comprise the compression shoulder 676, and the second locking nub 677 can extend from the side leg 674 of the retainer ring 670. In example aspects, the compression of the cone rubber seat 640 can be increased as the gate 130 is seated with the cone seat assembly 310. Furthermore, according to example aspects of the retainer ring 670, the top leg 672 of the retainer ring 670 can be angled radially inward, relative to the valve body axis 124, towards the cone rubber seat 640, such that a distal end 673 of the top leg 672 can press against the top end 650 of the cone rubber seat 640 to bias the cone rubber seat 640 into the seating pocket 660, and therefore further securing the cone rubber seat 640 between the retainer ring 670 and the cone metal seat 610. The various features provided for securing the cone rubber seat 640 within the seating pocket 660 can aid in preventing the cone rubber seat 640 from being pulled out of the seating pocket 660 during high rates of fluid flow.

The cone metal seat 610, cone rubber seat 640, and retainer ring 670 can generally define a cone seat subassembly 680. Example aspects of the cone seat subassembly 680 can be received between a retainer wall 604 of the cone body 314 and the retainer plate 312, as shown. The retainer plate 312 can be coupled to the cone body 314 by one or more fasteners, such as, for example, a bolt 690, as shown. In other aspects, the fastener can be any other suitable fastener known in the art. The fastener can be sufficiently tightened to ensure that the cone seat subassembly 680 is secured between the retainer wall 604 and the retainer plate 312. Example aspects of the retainer plate 312 can also define one or more adjustment holes 692 therethrough. In example aspects, a fastener, such as an adjustment screw 694, as shown, can be received through one of the corresponding adjustment holes 692. The adjustment screw 694 can engage the side leg 674 of the retainer ring 670, as shown, and can be selectively tightened to press the side leg 674 of the retainer ring 670 against the cone rubber seat 640, in order to further compress the cone rubber seat 640 between the retainer ring 670 and the cone metal seat 610 by reducing the volume of the seating pocket 660. Providing such adjustment means has the benefit of allowing the compression of the cone rubber seat 640 to be attuned to optimize the performance of the cone rubber seat 640 in varying conditions.

Figure 7:
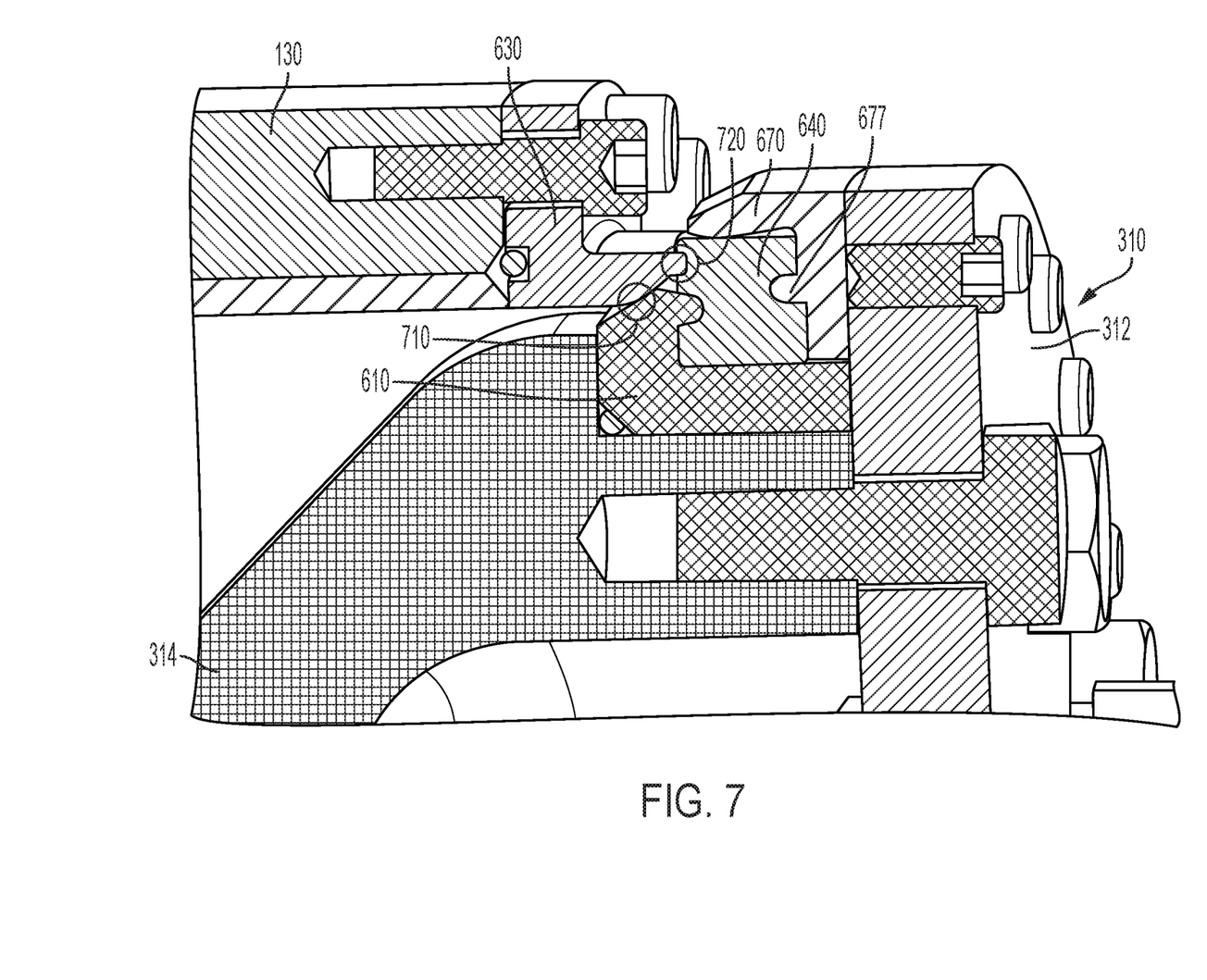
FIG. 7 is a close-up, cross-sectional view of the fixed cone valve of FIG. 1 taken along line 4-4 in FIG. 3, wherein the gate of FIG. 3 is in the extended position.

As shown, in the present aspect, when fluid is flowing through the fixed cone valve 100 along the normal flow path (i.e., in through the valve inlet end 118 (shown in FIG. 1) of the valve body 110 (shown in FIG. 1), and out through the gate first end 232 of the gate 130), the metal-to-metal seating 710 between the gate metal seat 630 and the cone metal seat 610 can be oriented in the flow path of the fluid ahead of the metal-to-rubber seating 720 between the gate metal seat 630 and the cone rubber seat 640. As such, any debris within the fluid will reach the components of the metal-to-metal seating 710 first. According to example aspects, the metal-to-metal seating 710 can be more durable than the metal-to-rubber seating 720, and as such, can be less prone to damage from debris striking the seating. The speed of the debris can be slowed after striking the metal-to-metal seating 710, and as such, if the debris should also strike the metal-to-rubber seating 720, the damage will be minimized due to the slowed speed. Furthermore, in the event that the cone rubber seat 640 needs to be repaired or replaced, the cone rubber seat 640 can be easily removed from the fixed cone assembly 200 without needing to also remove the cone metal seat 610. For example, the cone rubber seat 640 can be removed by simply loosening the adjustment screws 694 such that they can disengage from the retainer ring 670, and removing the retainer ring 670 with the cone rubber seat 640. In some aspects, this step can be sufficient to allow for access to and removal of the cone rubber seat 640. In other aspects, the bolts 690 can also be loosened and/or removed, such that the retainer plate 312 can be loosened and/or removed in order to allow access to and removal of the cone rubber seat 640.

According to example aspects, a method for using the dual seating system to close the fixed cone valve 100 can comprise providing the gate 130 and the cone seat assembly 310 and moving the gate 130 relative to the cone seat assembly 310 from the retracted position to the extended position (shown in FIG. 7). The method can further comprise engaging the gate metal seat 630 of the gate 130 with the cone metal seat 610 of the cone seat assembly 310 to form the metal-to-metal seating 710, and engaging the gate metal seat 630 of the gate 130 with the cone rubber seat 640 of the cone seat assembly 310 to form the metal-to-rubber seating 720. Example aspects of the method can further comprise the steps of engaging the locking nub 618 of the cone metal seat 610 with the cone rubber seat 640, compressing the cone rubber seat 640 between the cone metal seat 610 and the retainer ring 670 of the cone seat assembly 310 with the compression shoulder 676, and/or pressing a top leg 672 of the retainer ring 670 of the cone seat assembly 310 against the cone rubber seat 640 to bias the cone rubber seat 640 into the seating pocket 660 defined by the cone metal seat 610 and the retainer ring 670.

FIG. 7 is a detail view of the cone seat assembly 310 and the gate 130 taken along line 4-4 in FIG. 3, wherein the gate 130 is in the fully extended position, and as such, the fixed cone valve 100 can be closed. The metal-to-metal seating 710 between the gate metal seat 630 and the cone metal seat 610 can form a first watertight seal between the gate 130 and the cone seat assembly 310, and the metal-to-rubber seating 720 between the gate metal seat 630 and the cone rubber seat 640 can form a second watertight seal between the gate 130 and the cone seat assembly 310. As such, in the event that the first watertight seal of the metal-to-metal seating 710 leaks or fails, the second watertight seal of the metal-to-rubber seating 720 can serve as a back-up seal to prevent further leakage.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A dual seating system comprising:
   a gate comprising a monolithic gate metal seat; and
   a cone seat assembly comprising a cone metal seat and a cone rubber seat;
   wherein the monolithic gate metal seat is configured to seat with the cone metal seat to define a metal-to-metal seating and the monolithic gate metal seat is configured to seat with the cone rubber seat to define a metal-to-rubber seating.

2. The dual seating system of claim 1, wherein the gate is configured to move between a retracted position and an extended position relative to the cone seat assembly.

3. The dual seating system of claim 2, wherein the gate engages the cone seat assembly in the extended position and disengages the cone seat assembly in the retracted position.

4. The dual seating system of claim 1, wherein the cone metal seat defines a sloped cone seating surface.

5. The dual seating system of claim 4, wherein the monolithic gate metal seat defines a sloped gate seating surface configured to engage the sloped cone seating surface.

6. The dual seating system of claim 1, wherein;
   the cone rubber seat defines a cone rubber seating surface;
   the monolithic gate metal seat defines a gate projection; and
   the gate projection engages the cone rubber seating surface.

7. The dual seating system of claim 1, wherein the cone metal seat defines a locking nub configured to engage the cone rubber seat.

8. The dual seating system of claim 1, further comprising a retainer ring, the retainer ring and cone metal seat defining a seating pocket, the cone rubber seat received in the seating pocket.

9. The dual seating system of claim 8, wherein the retainer ring defines a top leg angled toward the cone rubber seat, the top leg configured to bias the cone rubber seat into the seating pocket.

10. The dual seating system of claim 8, wherein the retainer ring defines a compression shoulder configured to compress the cone rubber seat between the retainer ring and the cone metal seat.

11. The dual seating system of claim 8, wherein the retainer ring defines a locking nub configured to engage the cone rubber seat.

12. The dual seating system of claim 1, wherein the cone rubber seat is configured to be removed from the cone seating assembly without removing the cone metal seat from the cone seat assembly.

13. A fixed cone valve comprising:
a valve body defining a fluid cavity; and
a dual seating system comprising:
   a fixed cone assembly external to the fluid cavity; and
   a gate configured to move relative to the valve body and the fixed cone assembly between a retracted position and an extended position;
   wherein, in the extended position, the dual seating system is configured to define a first seating between the gate and the fixed cone assembly and a second seating between the gate and the fixed cone assembly.

14. The fixed cone valve of claim 13, wherein the first seating is a metal-to-metal seating and the second seating is a metal-to-rubber seating.

15. The fixed cone valve of claim 14, wherein:
the metal-to-metal seating is defined between a gate metal seat of the gate and a cone metal seat of the fixed cone assembly; and
the metal-to-rubber seating is defined between the gate metal seat and a cone rubber seat of the fixed cone assembly.

16. The fixed cone valve of claim 14, wherein:
fluid is configured to flow through the fixed cone valve along a flow path; and
the metal-to-metal seating is oriented ahead of the metal-to-rubber seating along the flow path.

17. A method for using a dual seating system comprising:
providing a gate and a cone seat assembly;
moving the gate relative to the cone seat assembly from a retracted position to an extended position;
engaging a monolithic gate metal seat of the gate with a cone metal seat of the cone seat assembly to form a metal-to-metal seating; and
engaging the monolithic gate metal seat with a cone rubber seat of the cone seat assembly to form a metal-to-rubber seating.

18. The method of claim 17, further comprising engaging a locking nub of the cone metal seat with the cone rubber seat.

19. The method of claim 17, further comprising compressing the cone rubber seat between the cone metal seat and a retainer ring of the cone seat assembly.

20. The method of claim 17, further comprising pressing a top leg of a retainer ring of the cone seat assembly against the cone rubber seat to bias the cone rubber seat into a seating pocket defined by the cone metal seat and the retainer ring.

* * * * *